Aug. 24, 1943.   J. R. ORELIND   2,327,927
ROLL-OVER PLOW
Filed May 16, 1940   4 Sheets-Sheet 3

Inventor
John R. Orelind
By Paul O. Pippel
Att'y.

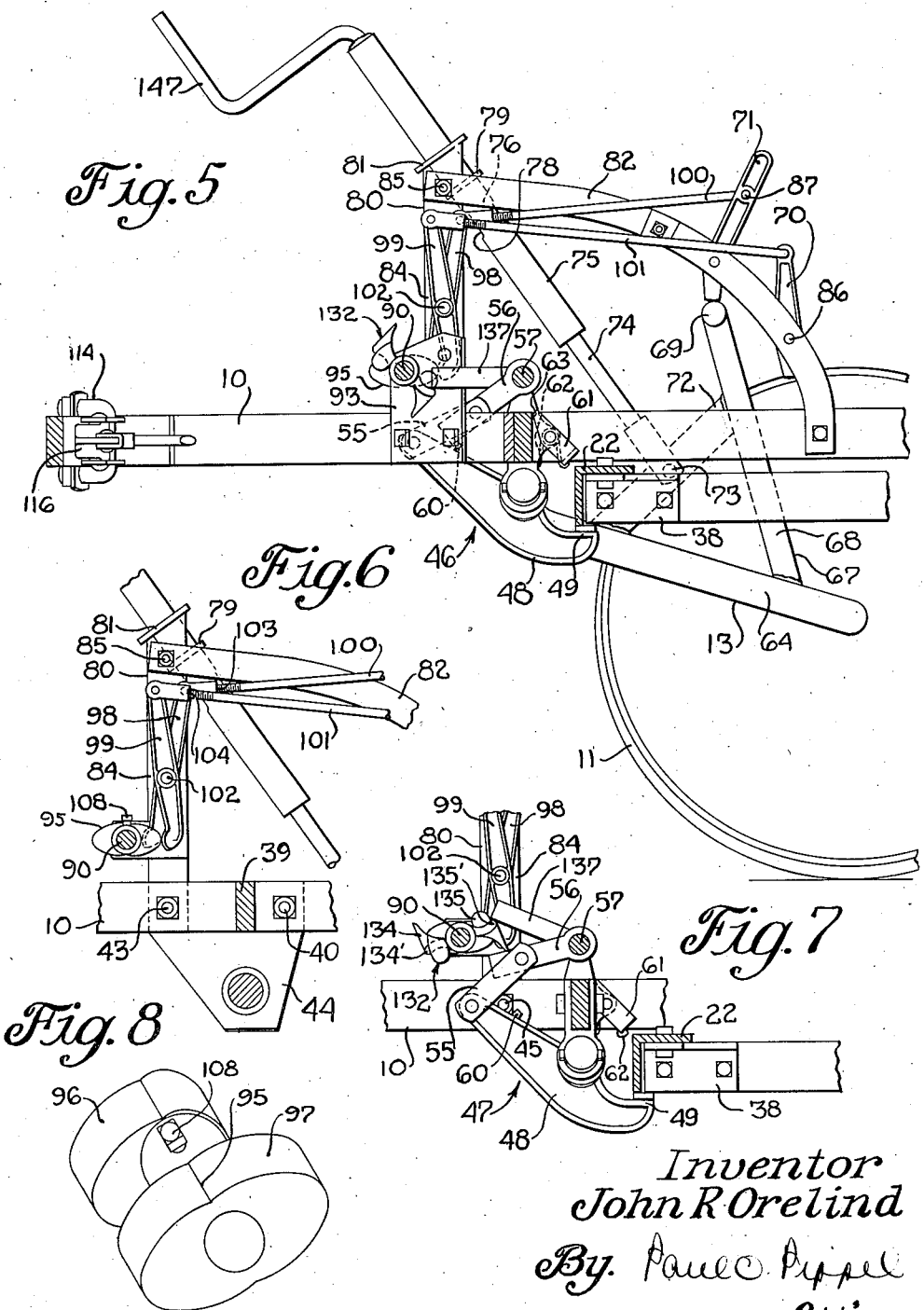

Patented Aug. 24, 1943

2,327,927

UNITED STATES PATENT OFFICE 2,327,927

ROLL-OVER PLOW

John R. Orelind, Canton, Ill., assignor to International Harvester Company, a corporation of New Jersey Application May 16, 1940, Serial No. 335,435

20 Claims. (Cl. 97—26)

This invention relates to roll-over plows. More particularly it relates to a type of roll-over plow wherein power lifting clutches are not used.

An object of this invention is to provide a roll-over plow with a control mechanism which is common to all of the mechanisms essential to the operation of a plow of this type. That is, by a single manual control, the entire assemblage may be prepared for the operation of a selected right-hand or left-hand plow bottom or the assemblage may be placed by the same control into a position of transport.

It is another object of the present invention to provide for such a type of roll-over plow an indicator mechanism wherein the operator may determine at any moment the relative position of the plow bottoms by mere reference to such mechanism.

It is still another object of the invention to provide an improved frame construction for both the main frame and the revolvable frame pivoted thereto, wherein adequate clearance for the passage of dirt from both the forward and trailing plows is obtained.

It is still another object of the invention to provide a simplified frame construction wherein the axle for the supporting wheels may be pivoted to the main frame ahead of the revolvable frame and adapted to extend along the side of the main frame to a location adjacent to the path prescribed by the revolvable frame for the proper balance of the plow.

It is a still further object of the invention to provide an arrangement for the connection of the supporting wheels to the frame wherein the same will be positioned at an angle with the vertical in order to permit main frame construction of greater width and to better position a wheel when run in a previously plowed furrow, so that it will stay in the same and not tend to get on the plowed ground.

It is a still further object of the invention to provide an arrangement for the lateral shifting of the draw-bar depending upon whether the right-hand or left-hand plow bottoms are next to enter the ground, and to associate the shifting of the draw-bar with the common control mechanism, so that the same will be automatically taken care of.

According to the present invention, there is provided a common manual control mechanism so associated with the entire assemblage of the roll-over plow that the same need only be pulled by the operator to effect the proper position of the plows relative to the ground. This single control mechanism need only be pulled four times to effect a complete positioning of right and left-hand plows with respect to the ground. Starting with the left-hand plow bottoms in the ground, the operator need only pull the mechanism once to effect positioning of the right-hand plow bottoms and for locating the same in a position of transport and ready to be dropped to effect plowing. Upon a second pull of the control mechanism the right-hand plow bottoms will be positioned for plowing. A third pull will then position the left-hand plow bottoms and bring the same to a position of transport while the fourth pull will again return the left-hand plow bottoms to their plowing position. This single control mechanism functions to operate the latch between the revolvable frame and the main frame, the adjustable stop mechanism at each of the respective sides of the plow for controlling the relative position of the plow frames with respect to the supporting wheels, and the latch mechanism for controlling the lateral positioning of the draw-bar with respect to the main plow frame. All of these separate mechanisms are so timed in proper sequence with respect to each other that the entire operation of the plow is automatic and dependent upon only the operation of the single control mechanism.

Associated with this single control mechanism is an indicator mechanism carrying small miniature plow bottoms, one representing the right-hand plow bottoms and the other representing the left-hand plow bottoms. By mere reference to these miniature plow bottoms, the operator may readily determine the respective positions of the right and left-hand plow bottoms of the plow.

Also, there has been provided a novel frame construction of both the main frame and the revolvable frame wherein the same is offset vertically with respect to the plow bottoms, so as to provide adequate clearance for the passage of dirt from both the forward and trailing plows without the same being interfered with by any part of either of the frame constructions. Also, in order to provide minimum width to the main frame construction and at the same time provide adequate width in portions thereof for the passage of plow bottoms of the high-speed type therethrough, this type having relatively longer mold-boards than the usual type of bottom, the respective supporting wheels at each side of the main frame are toed under or angled so as to be located or nested nearly under a portion of the main frame through which the plow bottoms pass upon being revolved with respect thereto and to, at the same time, obtain the additional advantage of having the wheels angled to effect maintenance of the same in the furrow during the plowing operation. The means for accomplishing the connecting of these wheels in this manner is effected through crank axles which are pivoted to the main frame ahead of the revolvable frame and which extend rearwardly thereof to a location adjacent to the path prescribed by the revolvable frame a sufficient distance for the desired balancing of the plow with respect to its hitch point. Associated with each of the wheels is a set of adjustable stops adapted to be operated by the common control mechanism for the proper positioning of the plow with respect to the supporting wheels in proper sequence of operation of the respective right-hand and left-hand plow bottoms. By so having the wheels connected to the main frame in this manner, trailing from the connecting point of the main frame, the same is most effective for the locating of these adjustable stops on the frame and to thereby provide for compactness of mechanism.

The draw-bar is connected to the main frame for lateral pivoting with respect thereto and associated with the forward portion of the main frame there are provided latches for retaining the draw-bar in either the right-hand or left-hand position and these latches are so connected to the common control mechanism as to be automatically operated thereby in proper sequence with the adjustable stop mechanism and with the latch trip mechanism which releasably retains the revolving frame with respect to the main frame. Also, the main latch trip device between the two frames has been made to operate on a toggle principle to provide for quick release of the revolvable frame.

For other objects of the invention and for a better understanding of the same, reference may be had to the following detailed description taken in connection with the accompanying drawings, in which:

Figure 5 is a view taken along the line 3—3 of Figure 1, but looking in the direction of the arrows b—b and thereby showing in elevation the adjustable stop mechanism for the right-hand supporting wheel of the plow;

Figure 6 is a detail view showing a portion of the controls for the adjustable stop mechanism at the right-hand side of the plow and looking generally in the direction of the arrows 6—6 of Figure 1;

Figure 7 is an enlarged detail view of the toggle control for the latch trip mechanism between the two frames and taken generally along the line 7—7 of Figure 1 and looking generally in the direction of the arrows thereof; and, Figure 8 is a perspective view of the particular cam used for controlling the adjustable stop mechanism at the right-hand side of the plow.

Figure 1:
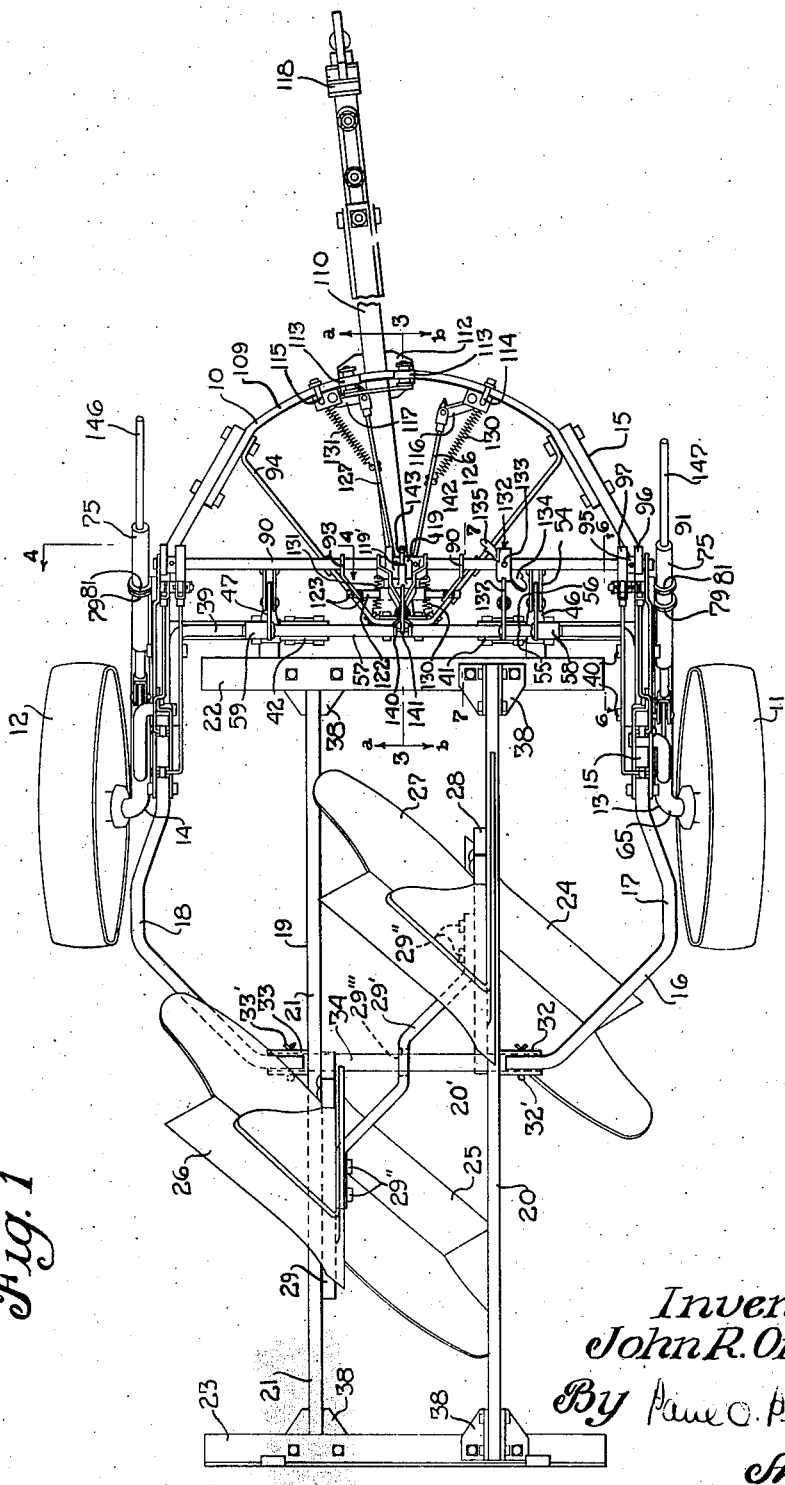
Figure 1 is a top plan view of a two-furrow, two-way, roll-over plow illustrating the arrangement of the respective mechanisms with respect to their common control mechanism.

Referring now to the drawings, there is shown a main frame 10 adapted to be supported from right-hand and left-hand supporting wheels 11 and 12 carried by the crank axles 13 and 14, respectively. This main frame has a narrowed forward portion 15 and a wide rear portion 16, the widening of the main frame being effected by lateral bending of right-hand and left-hand side members 17 and 18 thereof. Pivoted to the rear portion 16 of the main frame is a revolvable frame designated generally at 19 and comprising two longitudinally extending beam members 20 and 21 at the right-hand and left-hand sides thereof, respectively. These beam members are held in transversely spaced relation by transversely extending members 22 and 23, the same being of such width as to revolve with the longitudinally extending beam members through the main frame 10 to a position wherein the same may be releasably latched to the main frame by a latch mechanism to be described in detail hereinafter.

This revolvable frame carries on each side thereof, respectively, one pair of right-hand plow bottoms 24 and 25, and, on the opposite side thereof, the left-hand plow bottoms 26 and 27, each pair respectively including a forward bottom such as 24 or 26 and a trailing bottom such as 25 or 27. For the connection of the plow bottoms to the respective longitudinally extending members 20 and 21, there is preferably provided S-shaped beam members 28 and 29 (see Figure 2) adapted to be connected respectively to the longitudinally extending members 20 and 21. This fixing of the plow beams may be accomplished by means of transverse brace structure 29' fastened by means of bolts 29" to the longitudinally extending members 20 and 21, with the beam members 28 and 29, respectively, therebetween. Instead of double S-shaped beam members, there may be provided separate beams for each bottom and fixed to the members 20 and 21 by a structure similar to the one just described. These beam members may be further fixed to the longitudinally extending members by bracing straps 30 and 31. The S-shaped beam 28 is arranged vertically with respect to the longitudinally extending member and carries the forward right-hand plow bottom 24 of one pair, and on the opposite side of the member it carries the trailing left-hand plow bottom 27 of the other pair. The S-shaped beam member 29 connected to the longitudinally extending member 27 extends vertically to both sides thereof to carry the trailing right-hand plow bottom 25, and, on the opposite side thereof, the forward left-hand plow bottom 26. These plow bottoms are of the extended moldboard or long type, such as used for the effecting of high-speed plowing. These plow bottoms are of such extent so that it is necessary that the rear portion 16 of the main frame through which the plow bottoms pass upon revolution of the revolvable frame be extended laterally to provide adequate clearance for their passage therethrough. Thus, it will be noted that the side members 17 and 18 extend laterally to permit the passage of the plow bottoms 24 and 26, respectively, through the main frame. See particularly Figure 1. On the rear end of the side members 17 and 18, which are bent to extend transversely of the plows, there are welded, respectively, hollow brackets 32 and 33 with openings for reception of a shaft 34 held against lateral displacement by cotter pins 32' and 33' and extending through the longitudinally extending members 20 and 21 at a location midway between the ends thereof and through an enlarged opening 29''' in the bracing structure 29'. Openings 20' and 21' in the respective longitudinally extending members 20 and 21 form journal connections with the fixed shaft 34, whereby the entire frame 19 will revolve about the shaft 34. It may be further seen that it is with respect to the ends of these side frame members 17 and 18 that the revolvable frame 19 may revolve, so that the same will pass through the main frame 10 upon the rotation thereof.

Figure 2:
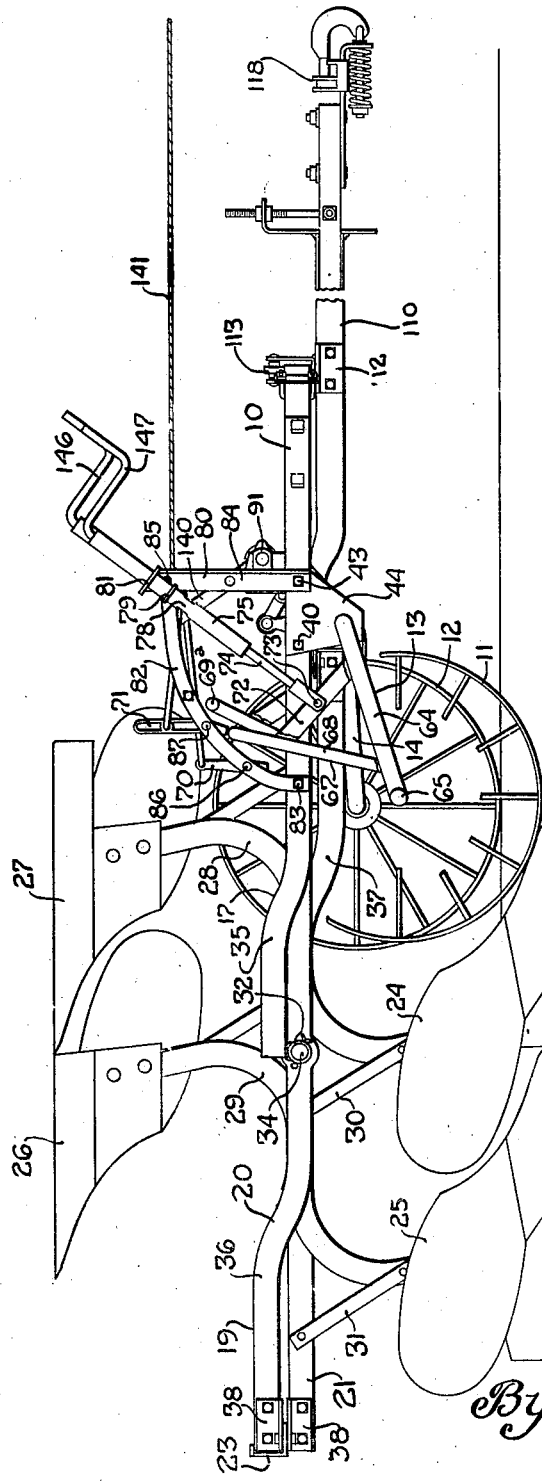
Figure 2 is a view in elevation with the right-hand plow bottoms in the plowing position and illustrating particularly the location of the right-hand and left-hand supporting wheels with respect to the adjustable stops for this position of the plow bottoms.

With the right-hand plow bottoms 24 and 25 in their plowing position, as shown in Figures 1 and 2, it should be noted that the side member 17 is not only bent laterally but that it is also bent vertically upwardly, as shown particularly in Figure 2 and as indicated at 35. The purpose for bending this side member upwardly is to provide for adequate clearance for the free lateral passage of dirt from the forward plow bottom 24 and without the same being interfered with by the side member 17. On the opposite side of the plow, the side member 18 is likewise bent to provide clearance for the dirt from the forward left-hand plow bottom 26 when it is in the plowing position. By having the side members 17 and 18 vertically offset or bent upwardly, and by having the hollow bracket members 32 and 33 respectively welded to the under edges thereof, this added clearance for the free passage of dirt is provided for.

In order to provide similar clearance for the trailing plow bottoms on the revolving frame, the respective longitudinally extending members 20 and 21 are so positioned with respect to the transverse members 22 and 23, and are so formed in addition thereto, as to provide added clearance for the passage of dirt from the trailing plow bottoms 25 and 27. As viewed in Figures 1 and 2, it should be noted that the longitudinally extending members 20 and 21 are respectively connected to the top and bottom faces of the transversely extending members 22 and 23. By having the member 20 connected to the top face of the transversely extending member 23, and by having the same bent upwardly, as at 36, added clearance for the passage of dirt from the trailing plow 25, connected to the longitudinally extending member 21, is provided. Likewise, the longitudinally extending member 21 is bent, as at 37, to provide for clearance for the passage of dirt laterally from the left-hand plow bottom 27 when in its plowing position. The connection of the ends of the longitudinally extending members to the transversely extending members is through a set of bracket irons indicated generally at 38. It should now be apparent that the frame members of the plow are so constructed as to provide added and free clearance for the passage of dirt from all four of its plow bottoms.

Figure 4:
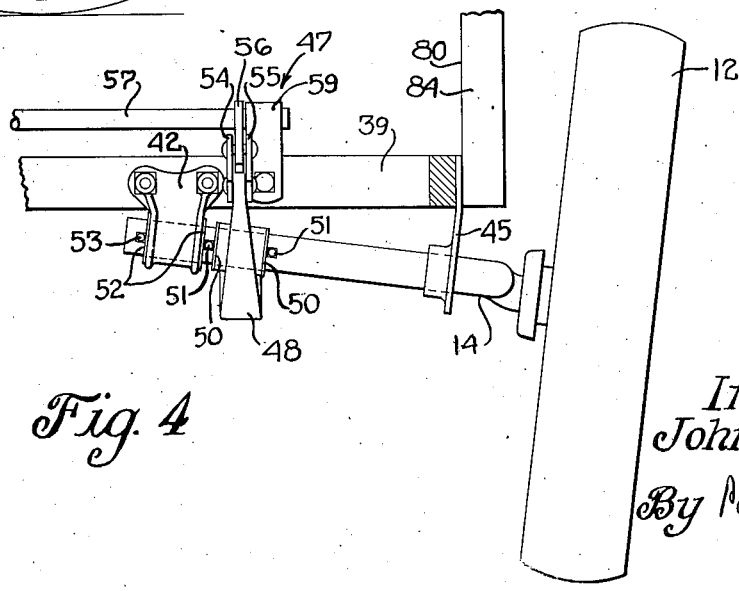
Figure 4 is a detail view in elevation, showing the angle position of the left-hand supporting wheel with respect to the main frame and looking generally in the direction of the arrows 4—4 of Figure 1.

The general frame structures of the plow now having been described, description will now be made of the various mechanisms essential to the automatic operation of the plow. The main frame 10, within its forward portion and connected between the side members 17 and 18, has a transversely extending brace member 39 connected therebetween by bolts 40 extending through a longitudinally bent portion thereof. The transversely extending bracing member 39 provides means to which the crank axles 13 and 14 may be attached at their inner ends, as by means of bearing brackets 41 and 42 rigidly connected with the transverse member 39. (See Figure 4.) Near the outer ends of the transverse bracing member 39 and on opposite sides of the main frame 10, by means of a certain number of the bolts 40 and by additional bolts 43, are connected, respectively, downwardly depending plate bearing members 44 and 45. As viewed particularly in Figure 4, it will be noted that the plate-bearing bracket 45 is of sufficient length to locate wheel axles and their respective wheels at an angle with respect to the main frame 10. By having the axles so angled, the wheels will nearly toe under the main frame and in this manner maintain a generally narrow construction of the main frame, but at the same time permit the widening portions of the side members 17 and 18. Also, the advantage will be obtained from the angling of the wheels of keeping the wheels in the furrows during the plowing operation. They will tend to be angled into the vertical land-side wall of the furrow.

These crank axles also serve as a support for the latch trip mechanisms 46 and 47, both of which are generally of the same construction, the latch mechanism 46 being at the right of the plow and on the axle 13, while the latch mechanism 47 is at the left of the plow and on the axle 14. These latch trip mechanisms extend into the path of the transverse members 22 and 23 of the revolvable frame 19 when it is desired to retain the revolvable frame against pivotal movement.

Figure 3:
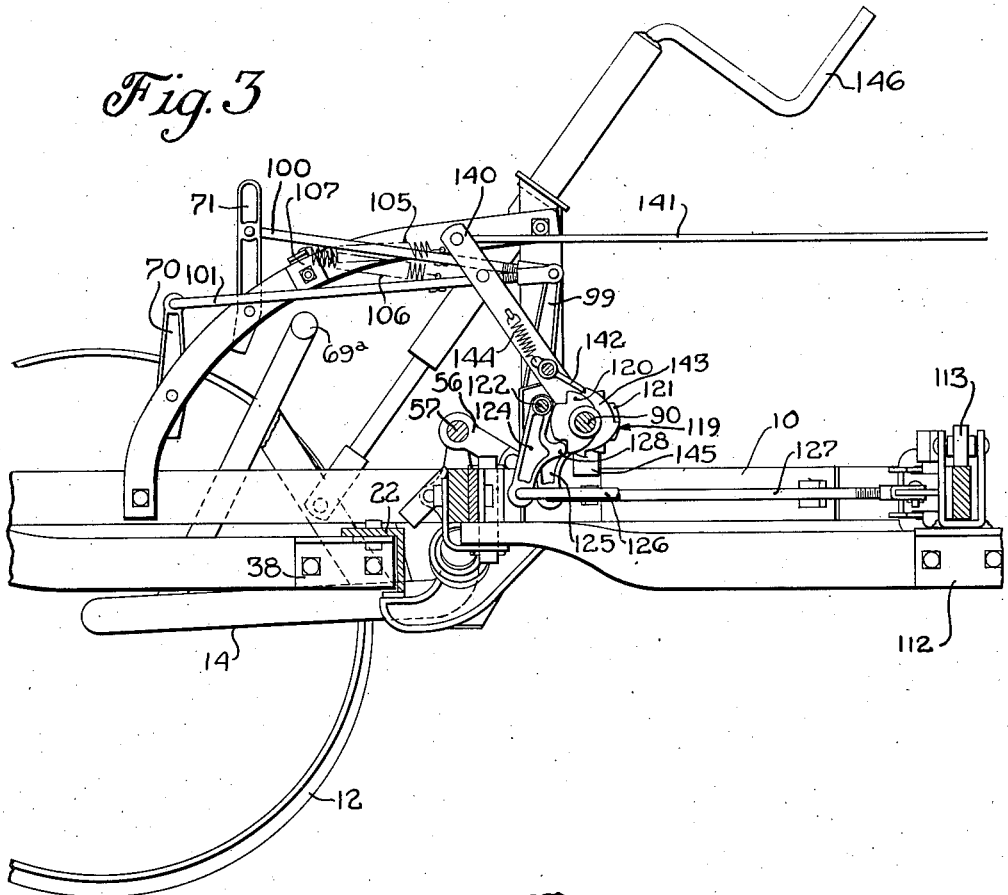
Figure 3 is an enlarged view in elevation of a portion of the machine taken along the line 3—3 of Figure 1 in the direction of the arrows a—a and illustrating the adjustable stop mechanism for the left-hand supporting wheel, and the common manually operable control means.

Referring now particularly to the Figures 3, 5, and 7, it will be noted that each latch trip mechanism comprises in general a main latch element 48 having a seat portion 49 adapted to extend into the path of the transverse members for engagement with the same. These main latch elements 48 are pivoted on their respective axle members and are retained against lateral movement by washers 50 and pins 51 (see Figure 4). The crank axles are in turn held within the brackets 41 and 42, respectively, by similar washers 52, a pin 53, and one of the pins 51. Pivoted to the end of the main latch member 48 opposite to the contact portions 49 is a pair of spaced toggle links 54 and 55, which are in turn pivoted to a toggle arm 56 rigid with a shaft 57 extending transversely and along the transverse beam member 39 to form a common operating shaft for both of the latch trip mechanisms 46 and 47. This shaft 57 is supported in the bearing brackets 58 and 59, which are, in turn, rigidly attached to the transverse beam member 39. The arms 56 form a part of a toggle with the link 55. When the toggle formed by these two parts 55 and 56 is set to prevent rotative movement of the latch 48 on the respective crank axles and, in turn, to retain the revolvable frame with respect to the main frame, the parts will have a position such as shown in Figure 5, with the arm member 56 against a stop 60 formed on the upper face of the main latch member 48.

In order to retain the transverse members 22 and 23 against the contact faces 49 of the latch elements, there is associated with each trip mechanism a swingable element 61 normally retained in its position, shown in Figures 5 and 7, by a spring 62, to thereby prevent reversal of rotation of the revolvable frame 19 once the same is revolved to engage the contacting faces 49. The element 61 is pivoted in a clockwise direction against the resistance of the spring 62, but is held against counter-clockwise movement by a contact of the same against the transverse member 39, as at 63. It should be noted that a portion of the element 61 extends rearwardly over the transverse member 22 forming a part of the revolvable frame. The means for operating the shaft 57 will be described hereinafter, it being kept in mind for the time being that the latch trip mechanisms 46 and 47, and other of the mechanisms, are all connected to this shaft, all of which go to make up an automatically controlled roll-over plow.

The adjustable stop mechanism for controlling the relative position of the frame with respect to the respective supporting wheels 11 and 12 will now be described. While the adjustable stop mechanisms on both sides of the plow are similar, only one of the same will be described in so far as they have parts in common. Description will be made particularly of the adjustable stop mechanism on the right-hand side of the plow, this being shown particularly well in Figures 2 and 5. The axle 13 for the supporting wheel 11 has a portion 64 which extends generally rearwardly along the right-hand side of the plow (see Figure 2) to locate the wheel 11 at the side of the plow sufficiently removed from the point of connection of the axle with the main frame to place the plow in balance with respect to its hitch point. The wheel 11 is carried on a transversely extending portion 65 of the crank axle 13. By so shaping the crank axle, the same may be connected to a point on the forward portion of the main frame 10 ahead of the revolvable frame 19, and extended rearwardly to a point adjacent to the path described by the revolvable frame 19. Generally, the longitudinally extending portion 64 of the crank axle 13 extends longitudinally with respect to the plow in practically all positions of the frame with respect to the supporting wheel 11. Carried on this longitudinally extending portion 64 of the crank axle is welded a bracket structure 67 having a vertically extending member 68 provided with a laterally extending portion 69 for contact with adjustable stops 70 and 71. The bracket structure 67 also includes a second element 72 welded to the member 68 at its upper end and at its lower end to the portion 64. To this member 68 is pivoted, as at 73, an adjustable link part 74. As shown particularly well in Figure 5, this adjustable link part 74 is threadedly connected to a hollow link part 75, as indicated at 76. The link part 74 is within the hollow part 75 and is threadedly connected to the same within an indented portion 78 of the hollow part 75. The parts 74 and 75 provide an adjustable structure for effecting change in the plowing depth of the plow bottoms in their plowing position. This adjustable structure is only effective when the wheel 11 is acting as a land wheel; that is, when the left-hand plow bottoms 26 and 27 are being used. Formed on the hollow part 75 is a radially extending flange portion 79. When the supporting wheel 11 is running on the land, this radially extending flange 79 will engage a bracket structure 80, as indicated at 81, and which is formed on the main frame 10. This bracket structure likewise serves as a support for the adjustable stops 70 and 71, the structure including an arcuate-shaped member 82 connected at its lower end to the main frame at 83 and to a straight vertically extending member 84 to which the arcuate member 82 is connected at its upper end, at 85, and this straight member 84 being, in turn, connected to the main frame by one of the bolts that retain the depending brackets 45 against the side member 17.

As shown in Figure 2, it will be seen that the transverse portion 69 of the member 68 is retained against the stop 71. In this position it will be noted that the wheel 11 is located to operate in the previously plowed furrow. In other words, this supporting wheel 11 is serving as a furrow wheel. When the latch mechanisms 46 and 47 are tripped, the revolvable frame 19 will be rotated in a clockwise direction by the forward movement of the plow, and the revolvable frame will in this manner be reversed to place the plow bottoms 24 and 25 in an inverted position. Before this position is reached and the revolvable frame moved 90 degrees to a perpendicular position, so that the main frame is supported with the transverse member 22 on the ground, the main frame 10 is moved upwardly with respect to the supporting wheels 11 and 12, and the laterally extending portions 69 will thereafter engage with the adjustable stop 70 located below the adjustable stop 71.

By this procedure, the frame is located fixedly with respect to the supporting wheels for transport movement with the plow bottoms held out of their plowing position. Each of these adjustable stops 70 and 71 is pivoted, as indicated at 86 and 87, to the arcuate shaped member 82. They are so pivoted that they may rotate in a clockwise direction out of the path of the transversely extending portion 69 of the member 68. When these adjustable stops are so moved out of the path of the transverse portions 69, the frame will be retained with respect to the supporting wheels by means of the adjustable linkage formed of the parts 74 and 75. The flange 79 of the hollow part 75 will engage the upper end of the vertical member 84 at 81.

On the upright members 84 and extending across the entire width of the forward portion 15 of the main frame 10 is journaled a rotatable shaft 90. This shaft is journaled to brackets 91 carried respectively by the upright members 84 on each side of the frame. To provide further support for this shaft, there are provided bracket members 93 located on bracing members 94 extending between the transverse member 39 and to the forward ends of the side members 17 and 18 of the main frame 10. On each of the ends of this shaft, there is located a cam member 95 (see Figures 1 and 8), one for each side of the frame, and each of which comprises a single lobe portion 96 and a double lobe portion 97, the cam 95 on the right-hand end of the shaft being arranged so that the single lobe part 96 is outermost, and on the opposite end of the shaft the cam 95 is similarly arranged with its single lobe 96 outermost. These lobes 96 and 97 of each cam 95 are adapted to cooperate respectively with the adjustable stops 70 and 71 through the cam contacting elements 98 and 99, respectively (see Figure 6). These cam contacting elements are pivoted to the upright member 84 and are connected respectively, by means of links 100 and 101, to the upper ends of the adjustable stops 70 and 71, respectively, to pivot the same about their respective pivots 86 and 87. The cam contacting elements 98 and 99 are pivoted to the upright member 84 at 102. The links 100 and 101 may be adjustable near to their points of connection with the contacting elements 98 and 99 at 103 and 104, respectively, for the proper setting of the adjustable stops with respect to the cam lobes 96 and 97, respectively. Referring now to Figure 3, it will be noted that the contacting elements 98 and 99 are maintained against the cam lobes 96 and 97 by means of tension springs 105 and 106 connected respectively to the link members 100 and 101, and both of the same being connected with the arcuate supporting members 82 at 107. When the cam lobe 96 is turned to move the contacting element 98 in a counter-clockwise direction, as viewed in Figure 6, the adjustable stop 71 will be removed out of the path of the transversely extending portion 69 of the member 68. This takes place once upon each full rotation of the cam 95 and the shaft 90. The double cam lobe portion 97 bears against the contacting element 99 to likewise turn the same about the pivot 102 in a counter-clockwise direction to remove the adjustable stop 70 out of the path of the transversely extending portion 69 of the member 68, which will be twice in each revolution of the cam 95 and the shaft 90, the cam 95 being at all times fixed to the shaft 90 by set screw 108. It should now be apparent that the structure for the opposite side of the plow frame for the control of the supporting wheel 12 may well be identical with the structure just described with reference to the right-hand supporting wheel 11.

Connected to the forward end side of the frame members 17 and 18 and forming part of the forward portion 15 is an arcuate member 109, which is connected to the ends of the side members 17 and 18 by the same means with which the ends of the brace members 94 are connected to the same. This arcuate member 109 forms a track over which a draw-bar 110 may be rolled about a pivot connection on the transverse member 39. The draw-bar 110 has a bracket structure 112 with rollers 113 which support the draw-bar with respect to the arcuate track member 109. By means of these rollers 113, the draw-bar 110 can move freely over the track to shift the forward end thereof to one side or another of a central location. The extent of throw of the draw-bar 110 to one side or another of the central location is dependent upon the setting and fixing of right-hand and left-hand latch-retaining bracket members 114 and 115 to the arcuate track member 109. To each of these bracket members 114 and 115, there are pivoted respectively dog latches 116 and 117 adapted to engage with the bracket structure 112 to retain the draw-bar to one side or the other of the central location.

The draw-bar 110 may have the usual draw-bar hitch structure 118 for connection to a tractor. The tractor to which this draw-bar is attached may be of any width and, in order to effectively make the roll-over plow adaptable for tractors of varying widths and in order that the plow wheel may run in the furrow in which the tractor wheel precedes the same, these bracket structures 114 and 115 may be arranged at different locations on the arcuate member 109.

Fixedly carried on the shaft 90 and intermediate the length thereof is a third cam 119, which likewise has two lobe portions 120 and 121 at opposite ends of the same, respectively, as shown particularly well in Figures 1 and 3. The cam 119 is fixed to the shaft 90 by means of a cotter pin 119'. On the brackets 93, which are in turn connected to the bracing members 94, there is pivoted a second transversely extending shaft 122 which is of relatively short length. This shaft 122 is held against lateral movement in the bracket by means of cotter pins 123. Pivoted on this shaft 122 are two swingable contacting members 124 and 125, which in turn extend laterally for connection with adjustable links 126 and 127, respectively, for connection with the respective dog latches 116 and 117. Each of these contacting members 124 and 125 have the forwardly projecting contacting faces 128 for contacting with the cams 120 and 121, respectively. The cam lobe portions 120 and 121 are angled with respect to each other 180 degrees, so that, when one of the dog latches 116 or 117 is open, the other dog latch will be closed to retain the bracket structure 112 and the draw-bar 110. The contacting faces 128 are maintained against the respective cams 120 and 121 by means of springs 130 and 131 connected respectively with the link members 126 and 127.

If the plow is being used with the right-hand plow bottoms in their plowing position (Figure 1), the plow frame will have been shifted to the right with respect to the hitch point 118 and with respect to the tractor to which the hitch mechanism is connected, thereby placing the supporting wheel 11 into the furrow to follow the tractor wheel which is likewise in the furrow. With the cam 119 arranged as shown to latch the draw-bar to the left when the right wheel 11 is in the furrow, the arrangement is for a tractor with the rear wheels widely spaced. Were the plow to be used with a tractor having wheels narrowly spaced, the cotter pin 119' could be removed and the cam 119 rotated 180 degrees on the shaft and then fixed by the same cotter pin. This would have the right latch 116 secure when the right wheel 11 is desired to be in the furrow.

It should now be seen that the shaft 90 has associated therewith, in addition to the adjustable stop mechanism at each side of the frame, also the means for fixing the draw-bar in a lateral position relative to the plow frame.

In order for the operator to know at all times, with little effort on his part, the position of the plow bottoms, there has been provided a miniature plow indicator means 132 fixed to the shaft 90 by means of a set screw 133 to rotate therewith. This indicator has thereon two miniature plow bodies 134 and 135 representing respectively the right-hand and left-hand plow bodies of the plow. When the miniature plow body 134 is in the position shown in Figures 1 and 5, the right-hand plow bodies 24 and 25 are in their ground-working position. It will be noted that the plow body 134 is pointed forwardly and downwardly. Also, from the position of the miniature plow body 135, it will be noted that the left-hand plow bodies are in their bottom-up or inverted position. When the miniature plow indicator is turned to a position such as indicated in Figure 7, with the miniature plow 134 pointing upwardly, the operator will know that that particular plow body is in transport position preparatory to being lowered into its plowing position. On the next quarter turn of the shaft 90 to place the miniature plow body 134 in the position to point forwardly and downwardly, as shown in Figures 1 and 5, the right-hand plows 24 and 25 will move to their plowing position, which will be indicated by the position of this miniature plow 134.

Forming a part of this miniature plow body 132 are cam portions 134' and 135' angularly spaced 180 degrees apart and which are adapted to contact an arm 137 rigidly secured to the shaft 57 to effect clockwise rotation thereof, as viewed in Figure 5, upon counter-clockwise rotation of the shaft 90. The rotation of the shaft 57 by this means will effect unlatching of the main latch element 43 by the breaking of the toggle formed by the link 55 and 56, the cotter of which is rigid with the shaft 57 to permit release of the revolvable frame 19, to thereby reverse the revolvable frame so that the left-hand plow bottoms will next be positioned ready to be lowered to their plowing position and wherein the miniature left-hand plow body 135 will be advanced to a position similar to the plow body 134 of Figure 7.

It should now be apparent that, in addition to providing a common means for the operating of adjustable stops and for the operation of the latch mechanism for the draw-bar, there has also been provided, by the use of this common shaft 90, means for releasing the latch mechanisms 46 and 47. It should also be evident that the various cams on the shaft 90 must be in definite angled relation with respect to each other for effecting operation of the various mechanisms in proper sequence to obtain the result of automatically preparing the plow for the plowing by first the one set and then the other set of plow bottoms.

As means for rotating the shaft 90, an arm 140, of hairpin shape, is pivoted thereto, and said arm at its outer end has connected thereto a pull rope 141, adapted to extend forwardly to an operator's station on the tractor. Carried by this arm 140 is a detent 142 adapted for cooperation with a ratchet cam 143 forming a part of the cam 119 (see Figures 1 and 3). This ratchet 143 has a series of four teeth, spaced 90 degrees apart, with which the detent 142 maintained by a spring 144 may engage. The lower or open end of the arm 140, which straddles the cam 119, has downwardly extending portions 145 adapted to engage with the shaft 122 when the arm 140 has been rotated through an arc of 90 degrees.

It should now be evident that the operator may, by the operation of a single control rope 141, effect rotation of the shaft 90 and in that way locate the several cams carried thereby for the proper positioning of the plow bottoms. Since, each time the operator pulls the rope, the shaft will be rotated through 90 degrees—starting with the right-hand plow bottoms in the ground and the shaft pulled through 90 degrees—the revolvable frame 19 will be released to reverse the right-hand plow bottoms so that they will be on top and to place the left-hand bottoms for presentation to the ground, whereupon, with the next pull of the rope 141 through a second 90 degrees, these plows will move into plowing position. The third pull of the rope to rotate the shaft 90 degrees will again release the revolvable frame 19 and place the right-hand plow bottoms for presentation to the ground, but will retain the same in transport position until, upon the fourth pull of the rope, when they will be dropped to their plowing position. Thus, upon four pulls of the rope, the shaft 90 and ratchet cam 143 will have been rotated through one complete revolution, or 360 degrees.

When the plow is in the position shown in Figures 1 and 2, with the right-hand plow bottoms in the ground, or plowing position, it will be noted that the right-hand wheel 11 is in position to run in the furrow and that the transversely extending portion 69 is against the stop 71, whereas the left-hand wheel 12 is running on the land with the transversely extending portion 69a for that side of the frame being out of connection with either of its latches 70 and 71, and that the flange 79 on the left-hand side of the frame is in engagement with the flange on the upright bracket 84 at 81. The hollow part 75 at the left-hand side of the frame may be adjusted by a hand crank 146. It should now appear that a plowing depth of the right-hand plow bottoms will be controlled from the land wheel 12 at the left-hand side of the plow and that this depth adjustment may be effected by the crank 146. Similarly associated with the supporting wheel 11 at the right-hand side of the plow, is a hand crank 147 for turning of the hollow part 75 of that adjusting mechanism for regulating the working depth of the left-hand plow bottoms in the ground and when the supporting wheel 11 is serving as a land wheel.

Upon one-quarter turn of the shaft 90, starting with the position shown in Figures 1 and 2, with the right-hand bottoms in the ground, the latch trip mechanisms 46 and 47 will be released and at the same time the adjustable stops 70 on both sides of the implement plow will have been placed in the path of their respective transverse portions 69 and 69a to thereby retain the frame in its highest and transport adjustment with respect to the supporting wheels 11 and 12. With the next quarter pull of the shaft 90, both of the adjustable stops 70 will have been drawn out of the path of their respective transverse portions 69 and 69a of the wheels 11 and 12, and the transverse portion 69 on the right-hand side will be free to take the position so that the flange 79 will abut at 81 the vertical member 84 to fix the plowing depth of the left-hand plow bottoms. The adjustable stop 71 on the left-hand side, which had been out of the path of its transverse portion 69a will have been placed in the path to position the frame relative to the wheel 12 on the left-hand side with that wheel running in the furrow. In the meantime, the draw-bar 110 will have been released and shifted to the right-hand side of the plow by movement of the tractor in turning about at the end of the field. In other words, and perhaps more briefly, it may be stated that the adjustable stops 71 operate alternately with respect to each other, whereas the adjustable stops 70 work together with each other.

It should now be apparent that there has been provided a control mechanism whereby the control of a roll-over plow may be effected by a single means to render the same entirely automatic for operation of first one set of plows and then the other set of plows, and that all this is accomplished by a mere pull of a single arm member by means of a rope which is merely pulled twice to change from the plowing of one set of plow bottoms to the plowing with the second set of plow bottoms. As the operator reaches the end of the field, it is only necessary that a single rope be pulled once to raise the plows to a transport position, and, secondly, when the plow is again positioned to return with the opposite plow bottoms presented to the ground, the operator need only pull the rope once to set the opposite plows in their plowing position.

Upon starting to open up a new field for plowing, the operator may adjust the hand cranks 146 and 147 to a less depth than that finally desired of the plows. After one or two turns across the field, the hand cranks 146 and 147 may be set to the desired plowing depth where they may be kept until the entire field has been plowed.

It should also be noted that there has been provided in a plow of this type an indicator mechanism whereby the operator may readily determine the position of the plow bottoms. Likewise, there has been provided in a roll-over plow a simplified frame construction wherein the frame may be of minimum dimensions and wherein added clearance is provided for the passage of dirt from the plow bottoms.

While various changes may be made in the detail construction of the present invention, it shall be understood that such changes shall be made within the spirit and scope of the present invention as defined in the appended claims.

What is claimed is:

1. In a roll-over plow, a main frame including side members, a revolvable frame pivoted between the side members of the main frame, said revolvable frame including a longitudinally extending member a portion of which on one side of the pivot connection with the main frame carrying a forward plow bottom and extending adjacent to one of the side members of the main frame, the portion of which extending rearwardly of the pivot connection being adjacent to a trailing plow bottom on the revolvable frame, and both the side member of the main frame and said latter portion of the longitudinally extending member adjacent to the respective forward and trailing plow bottoms being bent vertically upwardly to provide added clearance for passage of dirt from the respective plow bottoms.

2. In a two-furrow roll-over plow, a main frame, a revolvable frame pivoted to said main frame, said latter frame including two longitudinally extending members and transversely extending spacing members for connecting the longitudinally extending members together, one transversely extending spacing member being at each end of the frame, one pair of right-hand plow bottoms on one side thereof, one pair of left-hand plow bottoms on the opposite side thereof, each of the pair of said bottoms being respectively forward and trailing plow bottoms, a forward bottom of one pair and a trailing bottom of the other pair carried by each longitudinally extending member at opposite sides respectively of the pivot connection with the main frame, each of said transversely extending spacing members having top and bottom faces when the plows are parallel with the ground, the ends of one of the longitudinal members connected to the top face of said transverse members and the ends of the other of the longitudinal member connected to the bottom faces of said transverse members, and that portion of each longitudinally extending member respectively at the side of the pivot opposite to which the plow bottoms are carried and adjacent to the respective trailing plow bottoms being on the top face of the transversely extending member when the particular trailing plow bottom is in the ground to thereby provide added clearance for the passage of dirt from that plow bottom.

3. In a two-furrow roll-over plow, a main frame, a revolvable frame pivoted to said main frame, said latter frame including two longitudinally extending members, one pair of right-hand plow bottoms on one side thereof, one pair of left-hand plow bottoms on the opposite side thereof, each of the pair of said bottoms being respectively forward and trailing plow bottoms, a forward bottom of one pair and a trailing bottom of the other pair carried by each longitudinally extending member, but at opposite sides respectively of the pivot connection with the main frame, and that portion of each longitudinally extending member respectively on the other side of the pivot to which the plow bottoms are carried and adjacent to the respective trailing plow bottoms being offset vertically when one pair of bottoms are in the plowing position to provide added clearance for the passage of dirt from that trailing plow bottom.

4. In a two-furrow roll-over plow, a main frame, a revolvable frame pivoted to the main frame and including two longitudinally extending members and transversely extending spacing members for connecting the longitudinally extending members together, one spacing member being respectively at each end of the frame, one pair of right-hand plow bottoms on one side thereof, one pair of left-hand plow bottoms on the opposite side thereof, each of the pair of said bottoms being respectively forward and trailing plow bottoms, a forward bottom of one pair and a trailing bottom of the other pair carried by each longitudinally extending member, the connection of these plow bottoms to the respective longitudinally extending members being respectively opposite with relation to the pivot connection of the revolvable frame to the main frame, each of said transversely extending spacing members having top and bottom faces when the plows are parallel with the ground, the ends of one of the longitudinally extending members connected to the top faces of the transversely extending members while the ends of the other of the longitudinally extending members are connected to the bottom faces of the transversely extending members, and that portion of each longitudinally extending member on the side of the pivot opposite to which the plow bottoms are carried and adjacent to the respective trailing plow bottom being on the top face of the transversely extending member and offset vertically upward when one pair of plow bottoms are in their parallel position to thereby provide added clearance for the passage of dirt from that trailing plow bottom.

5. In a roll-over plow, a main frame including side members, a revolvable frame pivoted for rotative movement within said main frame and having right-hand and left-hand plow bottoms carried respectively on opposite sides thereof, the side members of the main frame being bent upwardly in locations near to the plow bottoms when in their working position to provide added clearance for the lateral passage of dirt from the plow bottom.

6. In a two-furrow roll-over plow, a main frame, a revolvable frame pivoted to the main frame and including a longitudinally extending member, forward and trailing plow bottoms, one portion of the longitudinally extending members ahead of the pivot connection of the latter frame with the main frame carrying the forward plow bottom, and that portion of the longitudinal member in rear of the pivot connection and adjacent to the trailing plow bottom being offset vertically to provide added clearance for the passage of dirt from the trailing plow bottom.

7. In a roll-over plow, a main frame having forward and rearward portions, a revolvable frame pivoted to the rearward portion of said main frame for rotative movement in the direction of travel of the plow and having right and left plow bottoms carried respectively on opposite sides thereon, crank axles having supporting wheels thereon pivoted to the forward portion of said main frame ahead of the revolvable frame and with the wheels thereof extending rearwardly along the sides of the frames, and adjacent the path prescribed by the revolvable frame.

8. In a roll-over plow, a main frame having forward and rearward portions, a revolvable frame pivoted to the rearward portion of the main frame and adapted to pass through the main frame upon forward movement of the plow, crank axles pivoted to the forward portion of said main frame ahead of the revolvable frame and adapted to extend rearwardly along the sides thereof, and a supporting wheel on each of said crank axles adjacent to the path prescribed by the revolvable frame, whereby said wheels will be located for proper balance of the plow.

9. In a roll-over plow, a main frame having forward and rearward portions, and including side members, said main frame formed about its forward portion with portions of the respective side members in relatively close relationship while portions of the side members about its rearward portion are formed in relatively widely spaced relationship, a revolvable frame pivoted to the rearward portion of the main frame, crank axles each of which having a supporting wheel thereon, connected to the forward portion of the main frame ahead of the revolvable frame and adapted to extend rearwardly, to locate each wheel respectively near to the widely spaced portions of the side members, and said crank axles in their connection to the main frame being inclined downwardly to place the wheels at an angle with the vertical to nest the same substantially close to the closely spaced portions of the side members and under the widely spaced portions of the side members.

10. In a roll-over plow, a main frame having forward and rearward portions, a revolvable frame pivoted to the rearward portion of the main frame and adapted to pass through the main frame upon forward movement of the plow, crank axles pivoted to the forward portion of said main frame ahead of the revolvable frame and adapted to extend rearwardly along the sides thereof, and a supporting wheel on each of said crank axles adjacent to the path prescribed by the revolvable frame, whereby said wheels will be located for proper balance of the plow and stop means on the respective sides of said main frame and cooperative with the respective crank axles to locate the frames vertically with respect to the supporting wheels.

11. In a roll-over plow, a main frame, a revolvable frame pivoted to said main frame and adapted to be revolved into two retained positions with respect thereto, a supporting wheel located at the side of main frame, means for connecting the wheel to the frame to have arcuate movement in a vertical plane, means carried by the connecting means and adapted to project to a location above the main frame and to travel in an arcuate path thereabove, a bracket structure mounted on the top of said main frame, and a plurality of adjustable stop elements arranged to be intermittently moved into the path of said projected means on the connecting means in proper sequence depending upon the position in which the revolvable frame is to be retained to thereby properly locate the main frame with respect to the supporting wheel.

12. In a roll-over plow, a main frame, a revolvable frame pivoted to the main frame, a supporting wheel and a crank axle for connecting the supporting wheel to the main frame, latch means for normally retaining said revolvable frame against pivotal movement with respect to said main frame and including an element pivoted on said crank axle, and means for tripping the latch mechanism to release the revolvable frame.

13. In a roll-over plow, a main frame, a revolvable frame pivoted to the main frame, a pair of supporting wheels and independent crank axles for connecting each of the respective wheels to the main frame, a pair of latch devices adapted to engage said revolvable frame at spaced locations thereon to normally retain said revolvable frame against pivotal movement with respect to the main frame, each of said latch devices including an element pivoted on the respective crank axles, and means for simultaneously tripping the latch devices to release the revolvable frame.

14. In a roll-over plow, a main frame, a revolvable frame pivoted to the main frame, a pair of supporting wheels and independent crank axles for connecting each of the respective wheels to the main frame, a pair of latch devices adapted to engage said revolvable frame at spaced locations thereon to normally retain said revolvable frame against pivotal movement with respect to the main frame, each of said latch devices including an element pivoted on the respective crank axles, and toggle links adapted to be straightened to render the latch mechanism effective, and means common to both of said devices and accessible to the operator of the plow to upset the toggle links of both of said devices to release the revolvable frame.

15. In a roll-over plow, a main frame including longitudinally extending side members and a transversely extending frame member disposed between and connected to the side members, a revolvable frame connected to the rearward portions of said side members to be pivotable through the main frame between the location of pivot with the side members and the transverse member, a supporting wheel located at each side of the main frame to be adjacent to the path of rotation of said revolvable frame through the main frame for proper fore and aft balance of the plow, crank axle means for connecting the respective supporting wheels to the main frame in the location of the transverse member, and draft bar means likewise connected to the main frame in the location of the transverse member and extending forwardly of the main frame.

16. In a roll-over plow, a main frame, a revolvable frame having plow bottoms thereon and adapted to be connected to the main frame for pivotal movement with respect thereto, said main frame including side members bowed outwardly with respect to each other to provide clearance for the passage of the plow bottoms through the main frame upon pivotal movement of the revolvable frame with respect thereto but having their rear portions bent to extend inwardly to be aligned substantially transversely of the main frame, said side members being offset upwardly along the outwardly bowed portions thereof, bracket means secured to said transverse rear portions of the side members to be offset downwardly with respect thereto, and means for connecting the revolvable frame to the bracket means for pivotal movement of the same with respect to the main frame, whereby adequate clearance is provided for the passage of the plow bottom through the main frame and as well there is provided added clearance for the lateral passage of dirt from certain of the plow bottoms.

17. In a two-way plow, a main frame having a forwardmost portion, right-hand and left-hand plow bottoms connected to said main frame for alternate operation, a draft-bar pivoted to the main frame in rear of the forward-most portion for lateral shifting movement in one direction or another depending upon the particular plow bottom being put in operation, said forwardmost portion serving as a supporting track for the draft-bar ahead of its point of connection with the main frame, and a pair of latch devices carried by the forwardmost portion, one at each side of the draft-bar and adapted to retain the draft-bar in one or another of its shifted positions, means for placing one or the other of said bottoms in operation, and means cooperative with said placing means for operating one or the other of said latch devices depending upon the respective plow bottom being put in operation.

18. In a roll-over plow, a main frame, a revolvable frame having right-hand and left-hand plow bottoms adapted for alternate operation, said latter frame pivoted to the main frame for rotative movement with respect thereto, latch means for normally retaining said revolvable frame against rotation in two positions of the same with respect to the main frame, supporting wheels and means for locating the same depending upon positioning of the revolvable frame, a draft-bar movably connected to the main frame for lateral shifting movement, latch means for retaining the draft-bar in one or the other of its laterally shifted positions, and a single control means common to the latch means for the revolvable frame, to the locating means for the supporting wheels, and to the latch means for the draft-bar.

19. In a two-way plow, a main frame, right-hand and left-hand plow bottoms, means for connecting said plow bottoms to the main frame for alternate operation, independently connected supporting wheels, means for locating the main frame with respect to said wheels depending upon the particular plow bottom being placed in operation, draft means connected to said main frame for lateral shifting movements from one position to another position and depending upon the particular plow bottom being placed in operation, latch means for retaining the draft-bar in the one position or the other position, and common control means for the means for locating the frame with respect to the supporting wheels and for operating the latch means for retaining the draft-bar.

20. In a roll-over plow, a main frame, a revolvable frame connected to the main frame for pivotal movement with respect thereto and having right-hand and left-hand plow bottoms adapted for alternate operation, latch means for normally retaining said revolvable frame against pivotal movement, a supporting wheel connected at each side of the main frame, means to position the same at different heights with respect thereto depending upon the particular plow being put in operation, a draft-bar connected to the main frame to be shifted laterally from one position to another, latch means for retaining the draft-bar in one position or the other, common control means associated with the latch means for the revolvable frame, the supporting wheels, and the latch means for the draft-bar, said control means including a transversely extending shaft adapted to make a complete revolution and having cam members thereon for causing actuation of these essential parts of the plow, the active portions of certain of the cam members being angled at 90 degrees with respect to others for actuation of the parts in proper sequence, and a single manual control element for stepping said shaft through 90 degrees at a time.

JOHN R. ORELIND.